United States Patent
Jacobi

(10) Patent No.: US 10,068,069 B1
(45) Date of Patent: Sep. 4, 2018

(54) DENOTING PRECISE LOCATIONS AND ARGUMENTS IN BINARY PROGRAM CODE

(71) Applicant: White Hawk Software, Los Altos, CA (US)

(72) Inventor: Christian Peter Jacobi, Palo Alto, CA (US)

(73) Assignee: Whitehawk Software LLC, Palo Alto, CA (US)

( * ) Notice: Subject to any disclaimer, the term of this patent is extended or adjusted under 35 U.S.C. 154(b) by 0 days.

(21) Appl. No.: 14/720,682

(22) Filed: May 22, 2015

(51) Int. Cl.
*G06F 21/14* (2013.01)
*G06F 8/71* (2018.01)
*G06F 8/41* (2018.01)
*G06F 8/51* (2018.01)
*G06F 8/20* (2018.01)

(52) U.S. Cl.
CPC ............... *G06F 21/14* (2013.01); *G06F 8/71* (2013.01); *G06F 8/20* (2013.01); *G06F 8/443* (2013.01); *G06F 8/51* (2013.01)

(58) Field of Classification Search
USPC .......... 726/27; 717/120, 121, 122, 123, 136, 717/137, 146, 147, 148, 149, 159
See application file for complete search history.

(56) References Cited

U.S. PATENT DOCUMENTS

| 5,713,010 A * | 1/1998 | Buzbee | G06F 8/443 714/E11.209 |
|---|---|---|---|
| 8,510,571 B1 * | 8/2013 | Chang | G06F 21/54 713/187 |
| 2005/0183072 A1 * | 8/2005 | Horning | G06F 21/14 717/140 |

\* cited by examiner

*Primary Examiner* — Brandon Hoffman
*Assistant Examiner* — Samuel Ambaye
(74) *Attorney, Agent, or Firm* — Bachmann Law Group

(57) ABSTRACT

Engineers at a software maker can insert software markers, making a compiler provide object code markers that appear to invoke activities from the protection library, but actually have the effect of providing information to a protection process. The engineers can build a protected object file, from which a software protection tool can provide an executable file. The software protection tool can include any tool that can use a pointer to a program statement, including creating DLL's. Alternatively, the system can identify object code markers by their referencing known functions from CALL instructions. The software protection tool can reference and remove the CALL instructions at distinct build and protecting stages to differing degrees of interference with the program to be protected—to test the program without any protection; to test some aspects of protection; to replace the CALL instructions to refer to strong protection functions that effectively make the program tamper proof; to provide information to debug protection.

14 Claims, 2 Drawing Sheets

System 100

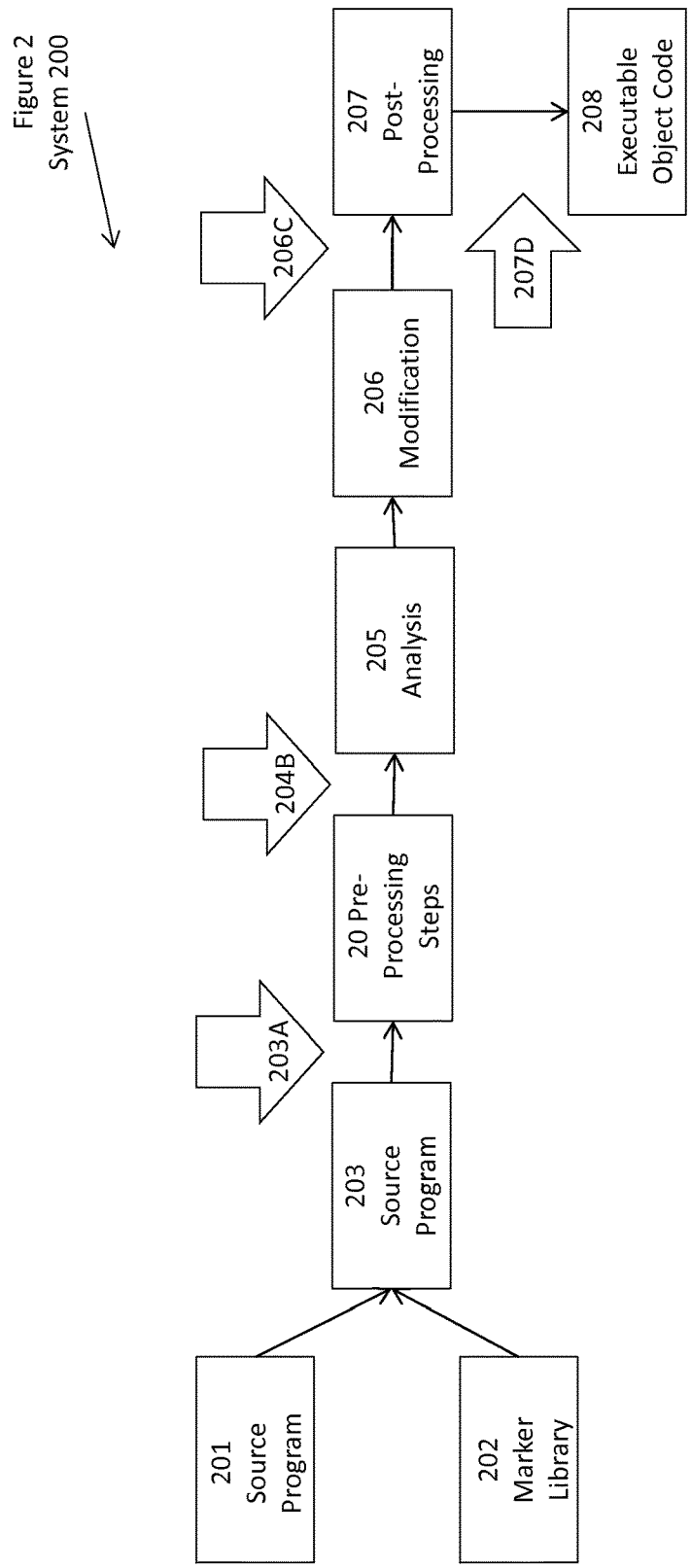

DENOTING PRECISE LOCATIONS AND ARGUMENTS IN BINARY PROGRAM CODE

1 INCLUDED DOCUMENT

This Application describes technologies that can be used with inventions, and other technologies, described in the following document. This document is sometimes referred to herein as the "Included Document", "Incorporated Disclosure", or variants of those phrases.

Application 62/002,073, filed May 22, 2014, in the name of Christian Peter Jacobi, titled "Method to denote precise locations and arguments in binary program code".

This document, as well as all documents cited therein, is hereby incorporated by reference as if fully recited herein. No aspect of incorporating these documents by reference is intended to be limiting in any way. The scope and spirit of the invention remains as broad as possible, given the specification and claims of this Application. This Included Document is additive in nature, and can be combined with the technical matter described herein, in whole or in part.

2 BACKGROUND

2.1 Field of the Invention

This Application relates to denoting precise locations and arguments in binary program code.

In one possible implementation, this Application can include a method of protecting object code against tampering and against reverse engineering.

Other and further possibilities are described herein.

2.2 Related Art

With the use of software tools to aid machines in performing many functions, or at least in performing them as well as possible, in some circumstances, those software tools have come to have large value. For example, software tools for controlling aircraft, chemical production, drug-lead discovery, and other dangerous or expensive equipment are often itself quite expensive, and are sometimes the subject of careful protection with intellectual property and other legal restrictions. For one example, the end-user of the software, or another attacker, can sometimes have sufficient access to reverse engineer the software, with the effect of discovering the techniques its designers used to achieve their results. For another example, any intermediate recipient that stores or transmits the software can sometimes modify it, such as to degrade the code, insert viruses or other malware, to attack a downstream recipient of the software.

However, assuring adequate protection of software against an owner of a computing device that actually has access to the code itself can be difficult. In some circumstances, it can occur that a software producer finds it inconvenient to use a server model of providing software, and thus wishes to allow an end-user to have access to the actual software, despite the risks involved. For one example, the device to be controlled might sometimes be out of communication with a software controller (such as aircraft or ships), thus involving the software controller actually be present to control the aircraft or ships. For another example, the device to be controlled might require nearly immediate response to changes in external or internal conditions (such as a chemical production plant or refinery), thus involving having the software controller preferably being as close as possible to the elements it is controlling.

Moreover, with the further development of virtual machines, parallel processing, cloud computing, and even supercomputing, it can occur that the software producer wishes to allow the recipient to access and use the software, such as on a frequent and repeated set of conditions, but might not fully trust the owner of the devices that provide computing power.

2.2.1 Information Disclosure Statement

The following documents might exemplify the prior art. However, the Examiner is exhorted and urged to make their own search and own evaluation of which, if any, of these documents are considered material to examination of this Application.

Rupp et al. (Aug. 16, 1994) U.S. Pat. No. 5,339,431, titled "Software compiler and linker with improved line-number table";

Brooks et al. (Dec. 6, 1994) U.S. Pat. No. 5,371,747, titled "Debugger program which includes correlation of computer program source code with optimized object code";

Kimelman (Aug. 29, 1995) U.S. Pat. No. 5,446,900, titled "Method and apparatus for statement level debugging of a computer program";

Arsenault (Sep. 10, 1996) U.S. Pat. No. 5,555,419, titled "Correlation system";

Mueller (Sep. 30, 1997) U.S. Pat. No. 5,673,390, titled "Method and system for displaying error messages";

Buzbee et al. (Jan. 27, 1998) U.S. Pat. No. 5,713,010, titled "Source line tracking in optimized code";

Zhu (Oct. 13, 1998) U.S. Pat. No. 5,822,592, titled "Method and system for determining source code location";

Baisley et al. (Nov. 2, 1999) U.S. Pat. No. 5,978,586, titled "Method for tracking changes in source locations in a compiler";

Baisley et al. (Nov. 2, 1999) U.S. Pat. No. 5,978,587, titled "Method for propagating source code locations into objects in a compiler";

Beaumont et al. (Nov. 25, 2003) U.S. Pat. No. 6,654,953 B2, titled "Extending program languages with source program attribute tags";

Baumann (Mar. 3, 2009) U.S. Pat. No. 7,500,221 B2, titled "Extending program languages with source program attribute tags";

Wheeler et al. (Dec. 15, 2009) U.S. Pat. No. 7,634,762 B1, titled "Selective post-compile conversion";

Sandys et al. (Jan. 18, 2011) U.S. Pat. No. 7,873,949 B2, titled "In source code suppression of binary analysis";

Each and every one of these documents, as well as all documents cited therein, are hereby incorporated by reference as if fully recited herein. No aspect of incorporating these documents by reference is intended to be limiting in any way. The scope and spirit of the invention remains as broad as possible, given the specification and claims of this Application. These Included Documents are additive in nature, and can be combined with the technical matter described herein, in whole or in part.

2.3 Some Drawbacks of the Known Art

Each of these issues, either alone or in combination with others (whether mentioned herein or otherwise), at some times, or in some conditions, can cause one or more problems with respect to sending, storing, or collaborating on, documents in a cloud service provider, with respect to other matters, or some combination or conjunction thereof.

3 BRIEF SUMMARY OF THE DISCLOSURE

3.1 This Application

This Application provides patentable subject matter that can ameliorate the problems described above, as well as others.

In one possible implementation, this Application can include a method denoting precise locations in binary software code, which can be extended to include varying kinds of arguments to functions and subroutine calls. The described techniques can be used in substantially any program having substantially any purpose.

In one possible implementation, this Application can include a method which can generally be used by software tools. As described herein, the method uses compiled code, which has not yet been finalized, to identify points in the object code which correspond to selected points in the source code. This allows software tools to operate on the object code, without the possible danger of leaving unwanted markers in the object code.

In one possible implementation, this Application can include a method which can transform selected object code into a designated portion of object code that is both tamper-resistant (that is, is relatively difficult to modify without destroying its function), and tamper-evident (that is, is relatively difficult to modify without leaving substantial evidence, to the program, not necessarily to a human examiner, of the modification).

3.2 System, Method, and Devices

In one possible implementation, a system provides a set of techniques, including patentable subject matter, by which one or more engineers at a software maker can insert source code markers, with the effect that a compiler will provide object code markers, aiding protection of the software. The system can also provide a protection library, delivered to the software maker, with the effect that the compiler can make use of the object code markers to invoke activities from the protection library. The system can also provide a protection script, for which a template can be delivered to the software maker, and modified by the software maker to suit any particular desires when protecting the software, with the effect that the engineers at the software maker can build a protected object file, including those elements of the software that the engineers wish to protect. The protected object file can be combined with un-protected libraries and un-protected object files, by a linker to provide an executable program, with the effect that the executable program should be both tamper-evident and tamper-resistant. In the context of the invention, there is no particular requirement to use any specified programming language or executable code; instead, if the linker is so capable, it can even produce byte codes for a Java Virtual Machine (JVM), or code for an assembly language or a higher-level language (HLL). More generally, the software protection tool, as described herein, is intended to be more general than an ordinary compilation-linker; the software protection tool can include any tool that can (optionally) use a pointer to a program statement, including, for one example, creating or locating Dynamic Link Libraries (DLL's).

In another possible implementation, the system can provide a set of techniques, including patentable subject matter, in which the original source code can be compiled by the compiler into something which contains the object code markers described herein. The system can identify those object code markers by their referencing known functions as the targets of a CALL instruction (or a sequence of instructions substantially substituting for the CALL instruction), or "calling conventions" such as used in Microsoft subroutine calls, or an abstract binary interface (ABI) such as used in Linux, or variants thereof, either removing them or replacing them with NO-OP instructions. Because CALL instructions can possibly couple independent sets of instructions, those CALL instructions (or substantial substitutes therefor) can protect against an optimizing compiler from moving instructions out of the sets of instructions defined by the CALL instructions. This has the effect that out-of-order instructions introduced by the optimizing compiler are protected against being moved between those sets of instructions before the CALL instruction and those sets of instructions after the CALL instruction. Those CALL instructions can protect against the optimizing compiler at differing stages of building the executable code. More generally, the software protection tool can reference the CALL instructions, at distinct protection times, to differing options for interference with the program to be protected:

- a null result, such as to test the program without any protection;
- a weak-protection result, such as to test some aspects of protection, such whether the protection shows effects of tampering;
- a strong-protection result, such as to replace the CALL instructions to refer to strong protection functions that effectively make the program tamper proof;
- . . . or other possible results, such as tailored to the type of desired protection.

After reading this Application, those skilled in the art will recognize that the engineers at the software maker need not have any particular skill in protecting software against tampering.

Other and further details are described herein.

3.3 Possible Applicability

After reading this Application, those skilled in the art would recognize that techniques shown herein are applicable to more than just the specific embodiments shown herein, are within the scope and spirit of the invention, and would be workable without undue experiment or new invention. Some particular implementations include one or more of the following:

- The system can provide assistance with adding object code in aspect oriented programming, instead of the adding to the source code.
- The system can provide assistance with debugging the protected program, testing assertions about program debugging, program behavior, testing correctness of a program or of a mathematical proof.
- The system can provide assistance with identifying and matching object code to source code, with the effect of providing assistance with compiler debugging, identifying causes of program crashes, or combinations or conjunctions thereof.
- The system can provide assistance with interfacing between human-written and software-written programs.
- The system can provide assistance with performance measurement of one or more portions of the object code, visualization of program behavior, high-level optimization of the program.

The system can provide assistance with protecting one or more portions of the object code against run-time attacks, such as by malware or by external program cracking.

. . . and other and further possible implementations.

Other and further techniques, as also shown and suggested by this Application, are applicable to more than just the specific embodiments shown herein.

4 BRIEF DESCRIPTION OF THE FIGURES

FIG. 2 shows a conceptual drawing of a system and method.

5 DETAILED DESCRIPTION OF AN EMBODIMENT

5.1 Terminology

5.1.1 Generality of the Description

Figure 1:
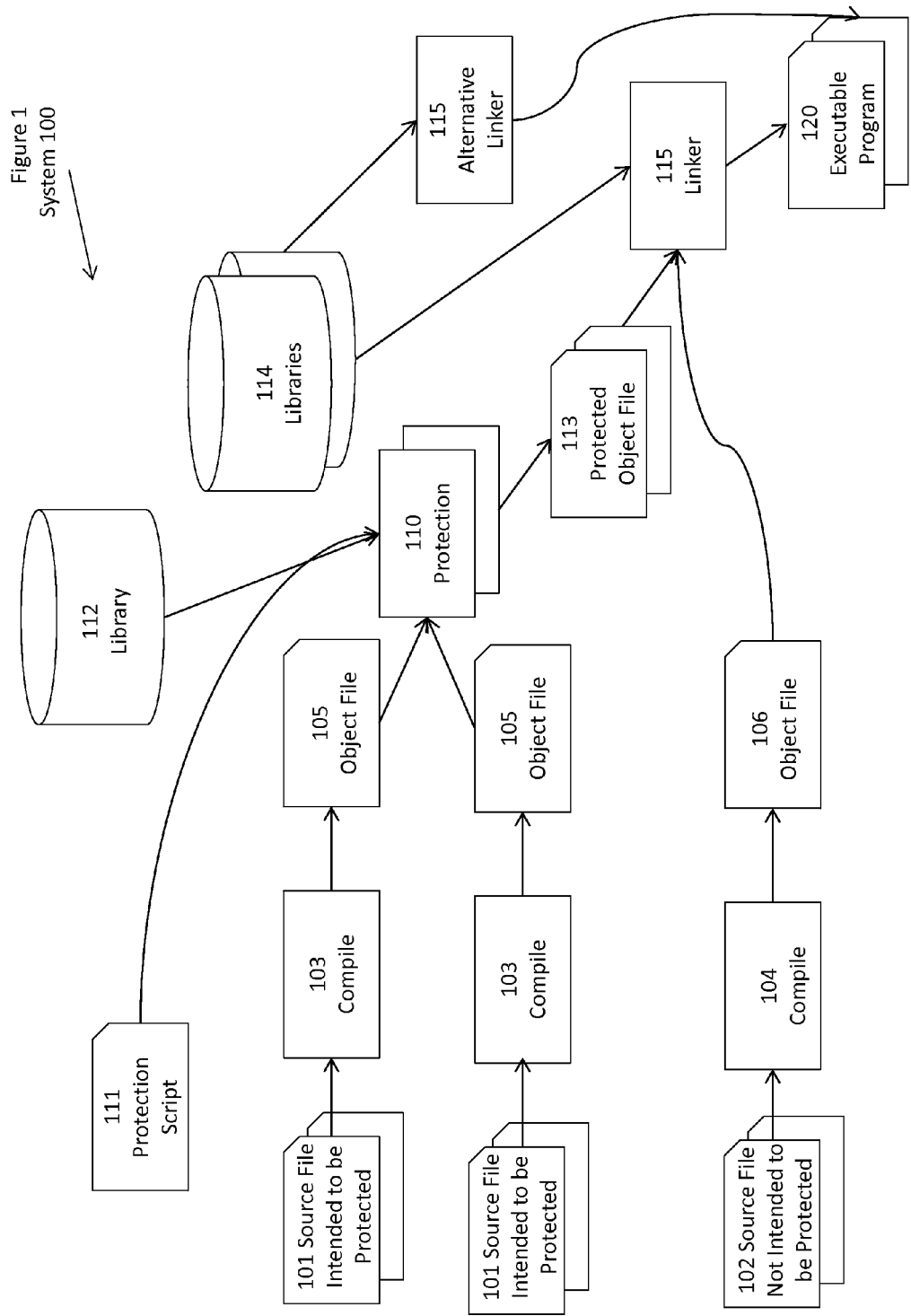
FIG. 1 shows a conceptual drawing of a system and method.

Ideas and technologies shown or suggested by this Application should be thought of in their most general form, including without limitation, considering one or more of the following:

The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.

When an apparatus element or a method step is said to "include", "perform", and variants thereof, or otherwise be restricted in some way, this Application should be read that the subpart of the apparatus element, or the substep of the method, and the restriction mentioned, is only optional, not required. After reading this Application, those skilled in the art would recognize that those apparatus elements or method steps need not necessarily include or perform those subparts or substeps. In the context of the invention, no such particular subparts or substeps are particularly required. In an alternative embodiment, apparatus elements or method steps without those subparts or substeps are within the scope and spirit of the invention, and would be workable without undue experiment or new invention.

The phrases and terms "in one embodiment", "in one implementation", "in one scenario" and variants thereof, generally refer that a particular characteristic, feature, or structure, described herein is included in at least one embodiment of the invention. Multiple uses of this phrase do not necessarily all refer to the same embodiment. Rather, the specific particular characteristic, feature, or structure, described herein might be combined in any suitable manner into one or more distinct possible embodiments.

The phrases and terms "perform" and variants thereof, generally refer (in the context of a set of instructions) any one or more means by which those instructions are executed or interpreted, or a device (such as a computing device) otherwise conducts the process indicated by that set of instructions. A set of instructions can be detected or interpreted at one location, and executed or its process conducted at another location. A set of instructions can be performed by a portion of a device, rather than the entire device, or by one or more devices, or by one or more portions of devices (the same device or different devices). A set of instructions can be executed by an emulated device, such as a virtual machine, "sandbox" environment, or otherwise. A set of instructions can also (optionally) be executed in part, halted or paused or stopped, transferred to another device, in whole or in part, and possibly continued.

The phrases and terms "relatively" and variants thereof, generally refer any relationship in which a comparison is possible, including without limitation "relatively less", "relatively more", and otherwise. In the context of the invention, where a measure or value is indicated to have a relationship "relatively", that relationship need not be precise, need not be well-defined, and need not be by comparison with any particular or specific other measure or value. For one example, whenever a measure or value is "relatively increased" or "relatively more", that comparison need not be with respect to any known measure or value, but might be with respect to a measure or value held by that measurement or value at another place or time, or with respect to a measure or value commonly used in the art.

The phrases and terms "substantially" and variants thereof, generally refer any circumstance in which a determination, measure, value, or otherwise; is equal, equivalent, nearly equal, nearly equivalent, or approximately; what the measure or value is recited to be.

For one example, The phrases and terms "substantially all" and variants thereof, generally refer any circumstance in which all, except possibly a relatively minor amount or number, have the stated property.

For another example, The phrases and terms "substantially none" and variants thereof, generally refer any circumstance in which none, except possibly a relatively minor amount or number, have the stated property.

For another example, The phrases and terms "substantial effect" and variants thereof, generally refer any circumstance in which an effect might be detected or determined.

The phrases and terms "techniques" and variants thereof, generally refer any "machine, method, article of manufacture, or composition of matter" suitable for description, including without limitation all such items within the scope of patentable subject matter. Whenever a description of a technique includes description of a method step, that this application thereby also describes (1) at least a "computer program product", such as one maintaining instructions that are interpretable by a computing device, where those instructions direct one or more devices to perform that method step; and (2) at least a "computing device" product, possibly including a specialized hardware device, such as one capable of performing that method step.

5.1.2 Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead.

The phrases and terms "calling sequence", "program call", "subroutine call" and variants thereof, generally refer any sequence of instructions generally used before or after a program jump instruction to another segment of computer program code, the latter capable of performing some substantially standard procedure, or other procedure that the programmer desires to keep separated from the rest of the program.

The phrases and terms "compiler" and variants thereof, generally refer any computer program capable of parsing one or more segments of human-readable program code, and generating one or more segments of linkable object code, executable object code, executable/interpretable byte codes, or program code in another computer language.

The phrases and terms "executable" and variants thereof, generally refer any computer-readable program capable of being parsed by one or more computing devices, and capable of being executed or interpreted by a computing device, such as a processor.

The phrases and terms "linker" and variants thereof, generally refer any computer program capable of parsing one or more segments of computer-readable program code, with references to external links, such as external libraries or other subroutines that might be called upon, and linking those segments of computer-readable program code with those references to external links, to provide one or more segments of executable computer program code.

The phrases and terms "tamper-proof" and variants thereof, generally refer any computer program substantially impossible of being tampered with. As any computer program can generally be tampered with if the attacker is willing to sacrifice the computer program's ability to work, the phrase "tamper-proof", and variants thereof, generally refer as well to computer programs that are both "tamper-evident" and "tamper-resistant".

The phrases and terms "tamper-evident" and variants thereof, generally refer any computer program substantially impossible of being tampered with, without showing evidence of that tampering to a software tool executed on that computing device (but often not to a human being), to a machine learning or artificial intelligence device, or otherwise. For one example, a locked filing cabinet made of light steel can be tamper-evident, in that breaking the lock will show, but is not tamper-resistant, in that it does not deter an attacker very much.

The phrases and terms "tamper-resistant" and variants thereof, generally refer any computer program substantially difficult to tamper with. For one example, a locked safe made of heavy steel and secured by a combination lock can be tamper-resistant, in that it is difficult to break into without knowing the combination to the lock, but is not tamper-evident, in that if an attacker does know the combination, it might be difficult for the owner of the safe to determine that tampering has occurred.

Any terms appearing in the figures but not explicitly described in this Application should be apparent to those skilled in the art.

5.2 Figures and Text

FIG. 1 shows a conceptual drawing of a system and method.

FIG. 2 shows a conceptual drawing of a system and method.

5.3 System Elements

5.3.1 Element Identifiers

Some system elements and sub-elements are sometimes described herein with respect to the following reference numbers and/or names:

100 system (as shown in FIG. 1)
    101 source file(s) intended to be protected
    102 source file(s) not intended to be protected
    103 compiler(s)
    105 object file(s) intended to be protected
    106 object file(s) not intended to be protected
110 protection elements
    111 protection scripts
    112 protection libraries
    113 object file(s)
    114 linkable libraries
    115 linker(s)
120 executable program

5.3.2 System Elements

FIG. 1 shows a conceptual drawing of a system and method.

In one possible implementation, a system 100 can include elements described herein, other elements shown in the figure, and possibly other elements. Not all elements are required. Elements should be considered optional, unless otherwise specified or unless clearly obvious for operation of the system. Elements should also be considered to be embodied in one or more devices, not necessarily in only a single device.

In one possible implementation, the system 100 can include one or more source files 101 intended to be protected, one or more source files 102 not intended to be protected, one or more first compilers 103, not necessarily identical, and one or more second compilers 104, possibly different from the first compilers 103, not necessarily identical. In this context, the phrase "not necessarily identical", and variants thereof, generally refers to the possibility that the source files 101 might not all be the same programming language, or even the same variant of a common programming language, and similarly for the source files 102. Similarly, the first compilers 103 might not all be for the same programming language, or even the same variant of a common programming language, and similarly for the second compilers 104. Source files 101 intended to be protected, and source files 102 not intended to be protected, can be formatted as directed by the specifications of a programming language (not shown), such as APL, C, C++, FORTRAN-70, LISP, Scheme, a macro assembly language such as for the DEC-20, or otherwise.

This can have the effect that the compilers 103 not intended to provide protected object files 106 provide object files 105 intended to be protected, also not necessarily identical, while the compilers 104 not intended to be protected provide object files 106, also not intended to be protected and also not necessarily identical. Similarly, in this context, the phrase "not necessarily identical", and variants thereof, generally refers to the possibility that the object files 105 intended to be protected might not all be in the same object file format, or even the same variant thereof, and similarly for the source files 102 not intended to be protected.

In another possible implementation, the system 100 can include one or more protection elements 110, one or more protection scripts 111, and one or more protection libraries 112 accessible thereto. In one case, the protection elements 110 collectively provide one or more protected linkable files 113. In another case, the one or more object files 106, not intended to be protected, the one or more protected linkable files 113, and one or more linkable libraries 114 can be linked by one or more linkers 115, with the effect of providing one or more executable programs 120.

For one example, these elements can be coupled and disposed as arranged in the figure. These elements, possibly with other elements, can alternatively be coupled and disposed differently; preferably, source files are coupled by compilers to object files, object files are coupled by protection elements to provide protected linkable files, and protected linkable files are coupled by linkers to provide one or more executable programs.

After reading this Application, those skilled in the art would recognize that these, or other elements in addition to or in lieu thereof, could also be used, in similar or differing configurations, with the effect of providing one or more executable programs with similar or different features. For some examples:

Different protected linkable files 113 can be provided for different numbers of processors on a target computing device.

Different protected linkable files 113 can be provided for different target computing devices.

Different protected linkable files 113 can be provided for different target processors on the same computing device.

Different protected linkable files 113 can be provided to exchange varying degrees of speed versus space consumption.

After reading this Application, those skilled in the art would recognize that these similar or differing configurations are within the scope and spirit of the invention, and would be workable without undue experiment or new invention.

5.4 System Elements, Method Flow Points and Steps 5.4.1 Element Identifiers, Flow Points and Steps Some system elements and sub-elements, and flow points and steps, are sometimes described herein with respect to the following reference numbers and/or names:

200 system and method (as shown in FIG. 2)
  201 source program to be protected
  202 library of marker functions
  203 source program to be protected, with markers inserted
  203A source code ready for compilation
  204 compilation and pre-processing
  204B compiled object file with additional information
  205 analysis (find markers)
  206 modification (remove markers)
  206C configuration flow graph (CFG)
  207 post-processing steps (obfuscation) and protection
  207D linkable object code
  208 executable object code
5.4.2 System Elements, Method Flow Points and Steps FIG. 2 shows a conceptual drawing of a system and method.

In one possible implementation, a system and method 200 can include elements, flow points, and steps as described herein; other elements, flow points, and steps shown in the figure; and possibly other elements, flow points, and steps. Not all elements, flow points, or steps are required. Elements, flow points, and steps should be considered optional, unless otherwise specified or unless clearly obvious for operation of the system. Elements, flow points, and steps should also be considered to be embodied in one or more devices, not necessarily in only a single device, and possibly performed by one or more devices, not necessarily by only a single device or by multiple devices working together.

In one possible implementation, a system and method 200 can include a source program 201, intended to be protected, a library 202 of marker functions, and an associated source program 203 to be protected, such as provided by augmenting the source program as modified with the marker functions. The source program 203 to be protected can include markers 203A, such as function calls to the library 202 of marker functions, and can generate an internal data structure 204B, such as a program structure ready to be protected.

After compilation at the step 204, in one possible implementation, a system and method 200 can include an analysis step 205, at which the method 200 can find markers inserted into the source program 201 intended to be protected. As part of this step, the method 200 can identify the type of markers, and any data associated with those markers. For one example, if the user has inserted names associated with markers into the source program 203, as part of this step, the method 200 can identify any string constants (or string variables) associated with those names.

In one example, the analysis step 205 can include a search for a calling sequence to one or more subroutines in the library 202 of marker functions.

In one such instance, the system and method can assure that the subroutine in the library 202 is a null subroutine, that is, that the subroutine does nothing of substance except to return back to its caller.

In another such instance, the system and method 200 can remove the calling sequence to the subroutine, leaving only a NO-OP ("no operation") at the end of the calling sequence as it was before the search for the calling sequence, and either (A) deleting all other instructions in the calling sequence, or (B) optionally replacing all other instructions in the calling sequence with NO-OP instructions. In the latter example, the protection script 111 can direct the one or more protection tools 110 to insert different or additional instructions, while attempting to preserve performance. In the latter example, the one or more protection tools 110 can include (A) an optional version of the protection tools 110 to preserve performance at the expense of maximum efficiency of memory space, (B) an optional version of the protection tools 110 to preserve memory space at the expense of maximum efficiency of performance, (C) other and further functions responsive to the nature of the CALL instruction.

In a first set of other such instances, the system and method 200 can assure that the calling sequence includes a (marked) first checkpoint, or "flag", before the subroutine is called, a (marked) second checkpoint, or "flag", before the subroutine returns control to the main program sequence, and an (unmarked) third checkpoint, left unflagged, after the subroutine returns control to the main program sequence. In such instances, the system and method 200 can (A) unroll the function into the main program sequence, keeping "begin-end" pairs and removing hanging "end" instructions; (B) replace the "begin" portion of the subroutine with a call to a null function; and (C) replace the "end" portion of the subroutine with a call to a null function. These distinct treatments can be made to have the same effect for protection purposes.

In a second set of other such instances, the system and method 200 can treat the calling sequence "as if" it did not execute at all. In such instances, the system and method 200 can note the spot at which the calling sequence occurred, and optionally insert an error into the program if an attacker attempts to jump over or skip over the calling sequence.

In other such instances, the system and method 200 can assure that it does not alter machine instructions that set flags (such as hardware flags that are set when a zero value is computed arithmetically). This can have the effect that loop constructs and related techniques are not broken by the protection technique.

In one possible implementation, a system and method 200 can include a modification step 206, at which the method 200 can remove markers that were inserted by the programmer into the source code 203, with the result that the programmer inserting a calling sequence the calling sequence referencing one of the library 202 of marker functions into their source program 201, has the effect that the compiler generates object code 204B with a calling sequence to that one of the library 202 of marker functions. The object program 204 to be protected can be associated with the compiled source program, including its markers 203A, and a further internal data structure 206C, such as a control flow graph (CFG) for the modified source program 203.

In another possible implementation, a system and method 200 can include a post-processing step 207, in which the internal data structure 204B can be post-processed to provide a tamper-protected program. In one example, the post-processing step 207 can include a set of operations to increase the difficulty for the attacker to copy, modify, or reverse engineer the protected program:

In one such instance, maintaining the CFG, the post-processing step 207 can randomly (or preferably, pseudo-randomly, with a deterministic form to the pseudo-random sequence) reorder sets of one or more (that is, blocks of) instructions (where the blocks are not necessarily the same length) to shuffle them, inserting jump instructions to assure that the instructions are executed in the order specified by the CFG.

In another such instance, the post-processing steps 207 can insert jump instructions and conditional jump instructions, while using hardware processor flags for the executable code to know which conditional branch to take, when operating on one or more of the object files 105 during the protection steps 110 to provide the protected object file(s) 113. This can be useful when there are multiple programmers providing source code 101 intended to be protected, and intended to be collected into a single protected program.

In another such instance, the post-processing step 207 can discard the CFG, as it knows the then-current object code should work.

In another example of such instances, the post-processing step 207 can further obfuscate the object code by inserting conditional jump instructions that the post-processing step 207 knows will never be executed (because their pre-conditions will never be met), further making it difficult for an attacker to determine the correct order of the instructions.

In another example of such instances, the post-processing step 207 can further obfuscate the object code by inserting jump instructions that point into a location that will damage one or more stack frames if executed. Similarly, in another example of such instances, the post-processing step 207 can further obfuscate the object code by inserting jump instructions that would return from a subroutine that would return from a subroutine to damage one or more stack frames if executed. Similarly, in another example of such instances, the post-processing step 207 can further obfuscate the object code by inserting jump instructions that cross over between subroutines, with the effect of damaging the stack frame if executed (or alternatively, to jump across and then jump back, with the effect of damaging the stack frame if not executed).

In another example of such instances, the post-processing step 207 can further obfuscate the object code by inserting jump instructions that point into a valid portion of the CFG, but with improper flags set, again further making it difficult for an attacker to determine the correct order of the instructions. As a general rule, the post-processing step 207 should be able to make the problem of determining the correct CFG exponentially difficult with the size of the CFG. In such cases, the post-processing step 207 can make the CFG as large as reasonably possible, with the effect of increasing the amount of work an attacker must perform.

In another example of such instances, the post-processing step 207 can further obfuscate the object code by inserting jump instructions that point into instructions that look real, but are in fact invalid, or into instructions that look real, but in fact have nothing of substance to do with the source code 201, again further making it difficult for an attacker to determine the correct order of the instructions.

In one example of such instances, the post-processing step 207 can further obfuscate the object code by reordering its instructions and inserting jump instructions (possibly conditional jump instructions), with the effect of making it more difficult for an attacker to determine the correct order of the instructions. This can be similar to obfuscating the CFG, as described herein.

In another such instance, the post-processing step 207 can further obfuscate the object code by encrypting at least a portion of the code, and hiding the encryption key in one or more locations it is unlikely to be found, such as the opcode of an instruction, or otherwise.

In another such instance, the post-processing step 207 can further obfuscate the object code by exchanging co-routines for subroutines, and vice versa.

In another such instance, the post-processing step 207 can further obfuscate the object code by exchanging misleadingly multithreaded code for single-threaded code, or by exchanging thread-safe code for misleadingly non-thread-safe code, or some combination or conjunction thereof.

In another such instance, the post-processing step 207 can further obfuscate the object code by inserting an indirect jump through a jump table, in which the index into the jump table is misleading, such as if it is calculated by obfuscated instructions, or based on a misleading jump table offset.

In still other instances, the post-processing step 207 can further obfuscate the object code using false or misleading interrupts, "white box cryptography", or other techniques, or combinations or conjunctions thereof, or other techniques not obvious in combination with steps 204 and 205.

In another possible implementation, the control flow graph (CFG) representation can be modified, with the effect that more information can be captured.

After reading this Application, those skilled in the art would recognize that these similar or differing configurations are within the scope and spirit of the invention, and would be workable without undue experiment or new invention. would recognize that these, or other elements in addition to or in lieu thereof, could also be used, in similar or differing configurations, with the effect of providing one or more executable programs with similar or different features. After reading this Application, those skilled in the art would recognize that these similar or differing configurations are within the scope and spirit of the invention, and would be workable without undue experiment or new invention.

5.5 Alternative Embodiments

5.5.1 Real-World Nature

After reading this Application, those skilled in the art would recognize that the invention is not directed solely to an "abstract idea". The invention does not encompass an "abstract idea" and all possible uses thereof, save only a relatively small set of such uses. Instead, this Application describes techniques (including patentable subject matter) that can make use of new concepts to provide useful and tangible results that originate in problems due to the nature of computer source code and object code programming, including denoting precise locations and arguments in binary program code. In at least one particular implementation, this Application provides "significantly more" than any singular "abstract idea". In at least one particular implementation, this Application describes techniques that can significantly improve the technologies of automated modification and enhancement of computer programs, computer program code, user interfaces, and data structures. Moreover, in at least another particular implementation, this Application describes techniques that provide meaningful limitations beyond generally linking an "abstract idea" to use of a generalized computing environment.

For one example, this Application describes techniques that provide significant improvements on ways that programs can be protected from attack, a problem that only arises due to the nature of computers themselves.

5.5.2 Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations and/or conjunctions thereof. Embodiments of the invention are not necessarily limited to computing devices, but can also include any form of device or method that can improve techniques for improving the effect of the machine operations described herein.

In one particular implementations, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; and/or otherwise.

5.5.3 Specification Not Limiting

After reading this Application, those skilled in the art would recognize that the invention is not limited to only the specifically described embodiments, that many variations are within the scope and spirit of the invention, and would be workable without undue experiment or new invention.

The invention claimed is:

1. A method for denoting locations in program code, comprising: receiving one or more sections of tamper-protectable source code at a computing device including a compiler and an object code modification tool; inserting markers into said tamper-protectable source code in response to user input received before the source code is compiled, said markers inserted into the source code before the source code is compiled and each marker having one or more instructions associated therewith in associated object code when said compiler is applied to said markers and said tamper-protectable source code, said associated instructions identifiable by said object code modification tool; compiling said markers within the source code and said tamper-protectable source code, providing tamper-protectable object code, wherein said compiler maintains optimization operations only on sets of instructions not crossing said markers; by said object code modification tool, finding said associated instructions in said associated object code; by said object code modification tool, removing said associated instructions from said associated object code; and obfuscating said object code, providing object code that is at least one of: tamper-resistant, tamper-evident; wherein said steps of obfuscating are responsive to a protection script, in response to which said steps of obfuscating protect selected portions of said source code, providing said associated object code.

2. The method of claim 1, including steps of: combining said protected portions of said source code with unprotected libraries and un-protected object files, providing executable object code.

3. The method of claim 2, wherein said executable object code includes a dynamic linked library.

4. The method of claim 2, wherein said executable object code includes instructions for a virtual machine.

5. The method of claim 2, wherein said executable object code includes instructions in another programming language.

6. The method of claim 1, including steps of testing source code assertions about operation of said tamper-protectable source code program.

7. The method of claim 1, wherein said steps of compiling are responsive to a protection library, in response to which said associated object code can invoke portions of said protection library.

8. The method of claim 1, wherein said steps of compiling associate, with source code between said markers in said source code, object code restricted between associated markers in said object code.

9. The method of claim 1, wherein said steps of finding, removing, and obfuscating collectively transform selected portions of said protectable source code into a portion of object code that is both tamper-resistant and tamper-evident.

10. The method of claim 1, wherein said steps of finding and removing collectively identify precise locations in binary software code associated with selected portions of said protectable source code.

11. The method of claim 1, wherein said steps of finding or removing are responsive to references to known functions of at least one of:
references to CALL instructions, references by sets of instructions substituting for said CALL instructions.

12. The method of claim 11, further comprising adding code that denotes arguments to the markers.

13. The method of claim 1, wherein said steps of inserting markers, finding, and removing collectively insert source code markers, in response to which said compiler provides object code markers, said steps of obfuscating being responsive thereto.

14. A method for denoting locations in program code, including steps of receiving one or more sections of protectable source code at a computing device, the computing device coupled to a compiler and an object code modifier; inserting source code markers into protectable source code in response to user input received before the source code is compiled, wherein when the source code markers and protectable source code are compiled, the compiler produces for each source code marker one or more associated object code marker instructions in associated protectable object code; compiling the source code markers and protectable source code, wherein the compiler performs optimization operations only on instruction blocks, the instruction blocks defined by not crossing object code markers in the associated object code; by the object code modifier, locating and removing the object code marker instructions from the associated object code before performing the associated object code; and obfuscating the object code while maintaining the function of each instruction block unchanged; wherein the steps of obfuscating the object code include one or more of inserting conditional branch instructions whose conditions are known to the steps of obfuscating to always branch; inserting conditional branch instructions whose conditions are known to the steps of obfuscating to never branch; inserting branch instructions which are known to the steps of obfuscating to cross stack frame boundaries and to never branch; and inserting conditional branch instructions whose conditions are known to the steps of obfuscating to cross stack frame boundaries and to return, and to always branch.

* * * * *